United States Patent [19]

Martz et al.

[11] Patent Number: 5,059,655

[45] Date of Patent: Oct. 22, 1991

[54] POLYURETHANE POLYANHYDRIDE OLIGOMERS AND METHOD OF PREPARATION

[75] Inventors: Jonathan T. Martz, Glenshaw; Karl F. Schimmel, Verona; Padmanabhan Sundararaman, Allison Park; David N. Walters, Pittsburgh, all of Pa.

[73] Assignee: PPG Industries, Inc., Pittsburgh, Pa.

[21] Appl. No.: 504,814

[22] Filed: Apr. 5, 1990

[51] Int. Cl.$^5$ ............ C08L 75/04; C08L 73/02
[52] U.S. Cl. .................... 525/131; 525/418; 525/450
[58] Field of Search .............. 525/131, 418, 450

[56] References Cited

U.S. PATENT DOCUMENTS

| | | | |
|---|---|---|---|
| 4,452,948 | 6/1984 | Marrion et al. | 525/207 |
| 4,753,998 | 6/1988 | Hayes et al. | 525/275 |
| 4,772,666 | 9/1988 | Just et al. | 525/185 |
| 4,798,745 | 1/1989 | Martz et al. | 427/407.1 |
| 4,798,746 | 1/1989 | Claar et al. | 427/407.1 |
| 4,826,921 | 5/1989 | Andrews et al. | 525/131 |

FOREIGN PATENT DOCUMENTS 0259172 3/1988 European Pat. Off. .

OTHER PUBLICATIONS

Chemical abstract for Japanese patent application No. 74-2998 published by the Japanese Patent Office on Jan. 23, 1974.

*Primary Examiner*—Melvyn I. Marquis
*Assistant Examiner*—Thomas Hamilton, III
*Attorney, Agent, or Firm*—Linda Pingitore

[57] ABSTRACT

A polyurethane polyanhydride oligomer is disclosed as well as a process for its preparation. The process involves the following steps:
(a) reacting a hydroxyl functional 2,4-dienoate ester with a polyisocyanate under conditions sufficient to react essentially all of the isocyanate groups to form a polyurethane polyene; and
(b) reacting by Diels Alder addition the unsaturated double bonds of the polyurethane polyene with an unsaturated polycarboxylic acid anhydride containing material. Also disclosed is a curable composition containing a hydroxyl functional material and the aforedescribed polyurethane polyanhydride oligomer.

9 Claims, No Drawings

POLYURETHANE POLYANHYDRIDE OLIGOMERS AND METHOD OF PREPARATION

BACKGROUND OF THE INVENTION

The present invention relates to polyurethane polyanhydride oligomers, a method for their preparation and their use in ambient temperature curable coating compositions to cure polyols.

In the area of automobile repair and refinishing, the capability of the coating to harden at ambient temperature is required when fully or partially repainting vehicles. Recognized products for this purpose include two package coating compositions based on, for example, hydroxyl functional materials such as acrylic polyols, and polyisocyanate curing agents. Polyisocyanate curing agents, however, have caused sensitization in a number of individuals, therefore, precautions must generally be taken. Also, particularly in the preparation of clear coating compositions, it is very important that the clear coating be transparent and non-yellowing.

Some particularly advantageous compositions from the perspective of low temperature cure, such as those described in U.S. Pat. No. 4,452,948 which are based on an anhydride hydroxyl curing mechanism, tend to yellow badly. This feature can be a significant detriment when color matching with an old finish is critical. The tendency to yellow is even more of a detriment when a clear topcoat composition is required for a color plus clear application method. This method involves coating a substrate with one or more applications of a pigmented basecoating composition to form a basecoat and then coating the basecoat with one or more coats of a transparent topcoating composition to form a transparent or clear topcoat. Should the clear topcoat yellow, the appearance of the vehicle is diminished.

There is a need therefore, for a non-isocyanate based clear coating composition which exhibits excellent physical properties, does not yellow and at least in some measure, reduces problems associated with sensitization.

SUMMARY OF THE INVENTION

In accordance with the present invention there is provided a polyurethane polyanhydride oligomer characterized in that it comprises at least one moiety represented by the following structure:

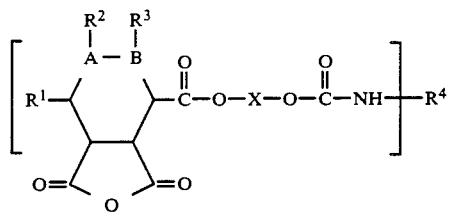

wherein:
X is:

—CH$_2$—CH$_2$—;

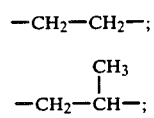

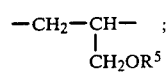

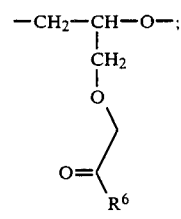

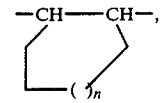

wherein n is 0, 1, 2, 3;

a fused ring system;

$R^1$ is hydrogen, or an aliphatic radical;

A and B are both CH— in which case $R_2$ and $R_3$ are independently hydrogen or an aliphatic radical; or A and B are both —C=;

$R^4$ is the residue of a mono or polyisocyanate;

$R^5$ is an aliphatic group, aromatic group, alicyclic group or

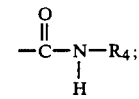

$R^6$ is an aliphatic, aromatic or alicyclic group.

Also provided in accordance with the present invention is a curable composition comprising:

(a) a hydroxyl functional material, and (b) a polyurethane polyanhydride oligomer characterized in that it contains at least one moiety represented by structure set forth and defined above.

The present invention also provides a process for preparing a polyurethane polyanhydride oligomer comprising the steps:

(a) reacting a hydroxyl functional 2,4-dienoate ester with a polyisocyanate under conditions sufficient to react essentially all of the isocyanate groups to form a polyurethane polyene; and (b) reacting by Diels Alder addition the unsaturated bonds of the polyurethane polyene with an unsaturated polycarboxylic acid anhydride containing material.

DETAILED DESCRIPTION OF THE INVENTION

The polyurethane polyanhydride oligomer of the present invention is characterized in that it comprises at least one moiety represented by the following structure:

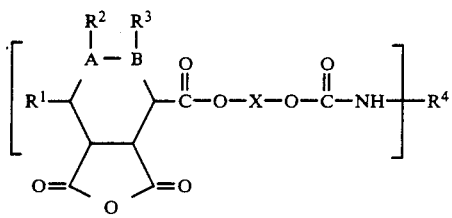

In the structural formula above, X can be any of the following moieties depending upon the particular starting materials chosen to prepare the oligomer:

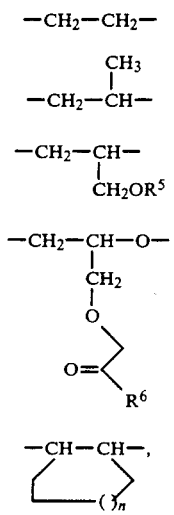

wherein n is 0, 1, 2, 3;
a fused ring system;
A and B are both CH— in which case $R_2$ and $R_3$ are independently hydrogen or an aliphatic radical; or
A and B are connected to form —C=C;
$R^4$ is the residue of a mono or polyisocyanate;
$R^5$ is an aliphatic group, aromatic group, alicyclic group or

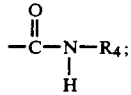

$R^6$ is an aliphatic group, an aromatic group or an alicyclic group.

The polyurethane polyanhydride oligomer of the present invention is prepared in the following stepwise process. First, a hydroxyl functional 2,4-dienoate ester is reacted with a polyisocyanate under conditions sufficient to react essentially all of the isocyanate groups to form a polyurethane polyene. A hydroxyl functional 2,4-dienoate ester is a hydroxyl functional material containing conjugated double bonds formed by reacting an epoxide containing material with a carboxylic acid having conjugated double bonds. When the acid and epoxide react, ring opening occurs and hydroxyl functionally is generated. Hence, as was mentioned above, depending upon the epoxide selected, a variety of structures may result. Examples of suitable epoxide containing materials include ethylene oxide, propylene oxide, glycidol, CARDURA E ester from Shell which is the glycidyl ester of a synthetic tertiary carboxylic acid, glycidyl ethers such as butyl glycidyl ether or phenyl glycidyl ether, cycloaliphatic epoxides such as cyclohexene oxide as well as epoxides which are part of a fused ring system such as dicyclopentadiene dioxide. The fused ring system may contain both cycloaliphatic and aromatic rings.

Examples of suitable readily available carboxylic acids having conjugated double bonds include sorbic acid. It should be understood that equivalently reactive materials for the purposes of this invention can be prepared utilizing muconic acid, sorbic alcohol, sorbic amine or a variety of conjugated acids, alcohols or amines containing a heteroatom such as oxygen or sulfur.

Once the hydroxyl functional 2,4-dienoate ester is prepared, it is reacted with an organic polyisocyanate such that essentially all of the isocyanate groups are reacted to form a polyurethane polyene. The organic polyisocyanate can be aromatic, aliphatic, cycloaliphatic or heterocyclic and may be unsubstituted or substituted with groups well appreciated by those skilled in the art. Examples of polyisocyanates useful in the preparation of urethanes include but are not limited to toluene-2,4-diisocyanate, toluene-2,6-diisocyanate, and mixtures thereof; diphenylmethane-4,4'-diisocyanate, diphenylmethane-2,4'diisocyante and mixtures thereof; para-phenylene diisocyanate; biphenyl diisocyante; tetramethyl xylxylene diisocyanate; meta-isopropenyl-alpha,alpha-dimethyl benzyl isocyanate; 3,3'-dimethyl-4,4'-diphenylene diisocyante; tetramethylene-1,4-diisocyanate; hexamethylene-1,6-diisocyanate; 2,2,4-trimethylhexane-1,6-diisocyanate; lysine methyl ester diisocyanate; bis(isocyanatoethyl)fumarate; isophorone diisocyanate; ethylene diisocyanate, dodecane-1,12-diisocyanate; cyclobutane-1,3-diisocyanate; cyclohexane-1,3-diisocyanate, cyclohexane-1,4-diisocyanate and mixtures thereof; methylcyclohexyl diisocyanate; hexahydrotoluene-2,4-diisocyanate, hexahydrotoluene-2,6-diisocyanate and mixtures thereof; hexahydrophenylene-1,3-diisocyanate, hexahydrophenylene-1,4-diisocyanate and mixtures thereof; perhydrodiphenylmethane-2,4'-diisocyanate, perhydrodiphenylmethane-4,4'-diisocyanate and mixtures thereof. In addition, isocyanurates and biurets are also suitable such as the biuret or isocyanurate of hexamethylene diisocyanate or isophorone diisocyanate. It is to be understood that mixtures of polyisocyanates and monoisocyanates may be utilized as the organic polyisocyanate. Moreover, isocyanate prepolymers may be utilized as the polyisocyanate. Isocyanate prepolymers refer to the reaction products of a polyol and polyisocyanate in which the polyol and polyisocyanate are reacted, by the generally known prepolymer technique, in relative proportions to produce the isocyanate prepolymer. Also, mixtures of organic isocyanate prepolymers with monomeric isocyanates (so-called semi-prepolymers) may be utilized in the prepolymer technique.

It is readily appreciated by those skilled in the art of polymer chemistry that a variety of polyols are suitable for this purpose, therefore they will not be discussed in detail here. If a detailed discussion of some specific examples is desired, reference is made to U.S. Pat. No. 4,798,745 which is incorporated by reference herein.

In addition, copolymers of a vinyl monoisocyanate with other vinyl monomers are also suitable herein.

The polyurethane polyene can be formed by reacting the hydroxy functional 2,4-dienoate ester with a polyisocyanate. This reaction is generally conducted at temperatures ranging from about 50° C. to about 80° C. and in the presence of an effective amount of catalyst for promoting the reaction between the hydroxyl group of the dienoate ester and the isocyanate groups of the polyisocyanate. Examples of such catalysts include organotin compounds such as stannous octoate and dibutyl dilaurate. In addition, the hydroxyl-isocyanate reaction is conducted in the presence of an effective amount of free radical polymerization inhibitor such as derivatives of phenol, hydroquinone and phenothiazine. The equivalent ratio of hydroxydienoate ester to isocyanate is preferably 1 to 1. The reaction is monitored by infrared spectroscopy and/or by analytical methods to determine free isocyanate.

The unsaturated bonds of the polyurethane polyene which has been described in detail above are then reacted with an unsaturated polycarboxylic acid anhydride containing material by Diels Alder addition to form the resultant polyurethane polyanhydride oligomer.

The claimed polyurethane polyanhydride oligomers have an anhydride equivalent weight not exceeding 1000, preferably not exceeding 700. The oligomers have a number average molecular weight generally ranging from about 670 to about 7000, preferably from about 750 to about 5500. Molecular weight as determined herein is determined by gel permeation chromatography (GPC) using a polystyrene standard.

The unsaturated polycarboxylic acid anhydrides suitable for use in the present invention should contain at least one carboxylic acid anhydride group per molecule. Examples of suitable materials include maleic anhydride, citraconic anhydride, tetrahydrophthalic anhydride and itaconic anhydride, with maleic anhydride being preferred.

The polyurethane anhydride oligomer is formed from the Diels Alder reaction of the polyurethane polyene with an unsaturated dicarboxylic acid anhydride. The temperature can range from about 25° C. to about 100° C., preferably at a range of about 60° C. to about 85° C. In this temperature range the reaction is readily facilitated without polymerization of the polyene. The reaction is monitored by infrared spectroscopy and viscosity. The C—H stretch of maleic anhydride is at 3100 $CM^{-1}$ and the C=C stretches for the diene ester are at 1605 $CM^{-1}$ and 1630 $CM^{-1}$. The equivalent ratio of diene to unsaturated dicarboxylic acid anhydride is preferably 0.9:1.0 to 1.0:0.9.

The polyurethane polyanhydride oligomers of the present invention are particularly advantageous for use in the preparation of non-yellowing coating compositions. The polyanhydride is utilized to cure with a hydroxyl functional material to form a crosslinked coating. It is believed that the curing reaction involves reaction of the hydroxyl functionality with the carboxylic acid anhydride functionality.

A coating composition according to the present invention comprises
(a) a hydroxyl functional material and
(b) the polyurethane polyanhydride detailed above.
Generally, a coating composition of the invention comprises an effective amount of a catalytic agent for accelerating the curing reaction between the hydroxyl groups of (a) and the anhydride groups of (b). Typically, the catalyst is an amino group present either in the molecule of the hydroxyl functional material or in a separate amine compound such as, for example, dimethyl cocoamine, triethylamine and triethanolamine. Suitable hydroxyl functional materials are detailed in U.S. Pat. No. 4,798,745 which is incorporated by reference herein.

The hydroxyl material (a) for use in a coating composition of the invention may be a mixture of a polymer containing hydroxyl but not amine groups with a polymer or compound containing hydroxyl and amine groups or the amine catalyst may be a separate amine compound not containing hydroxyl groups.

Generally the amounts of hydroxyl material (a) and anhydride component (b) in a coating composition of the invention are selected to provide a ratio of equivalents of hydroxyl groups to equivalents of anhydride groups in a range of from 3:1 to 1:2. Typically the hydroxyl component and anhydride component are utilized to provide a ratio of equivalents of hydroxyl groups to equivalents of anhydride groups of 1:1 to 1.6:1.

The components of a composition of the invention generally are incorporated in an organic solvent and/or diluent in which the materials employed are compatible and soluble to the desired extent. Organic solvent which may be utilized include, for example, ketones, aromatic hydrocarbons, esters or mixtures thereof. Illustrative of organic solvents of the above type which may be employed are ketones such as methyl ethyl ketone, methyl N-butyl ketone, and methyl isobutyl ketone; esters such as butyl acetate; and aromatic hydrocarbons such as xylene, toluene, and naphtha.

In addition to the foregoing components, a coating composition of the invention may contain one or more optional ingredients, including various pigments of the type ordinarily utilized in coatings of this general class. In addition, various fillers; plasticizers; antioxidants; mildewcides and fungicides; surfactants; various flow control agents including, for example, thixotropes and additives for sag resistance and/or pigment orientation based on polymer microparticles (sometimes referred to as microgels); and other such formulating additives may be employed.

A coating composition of the invention can be applied to a substrate by any conventional method such as brushing, dipping, flow coating, roll coating, and spraying; although typically they are applied by spraying. The compositions may be applied over a wide variety of substrates such as wood, metals, glass, cloth, plastics, foams and the like, as well as over primers. The compositions of the invention have utility in general coating applications and can also be useful in specialty applications such as automotive paints including paints for automobile refinishing. Coating compositions of the invention have been found to be especially useful in the so-called "color plus clear" method of coating. Because of their low temperature curing properties as well as the excellent appearance and durability properties that they can provide in cured films, they are particularly suitable to automotive refinishing applications.

As discussed above, certain known coatings based on a hydroxyl anhydride curing mechanism tend to yellow when the components of the coating composition are mixed together. The yellowing tendency creates problems particularly in light colored coating compositions, and especially with respect to transparent coating compositions for use, for example, as clear topcoating compositions in "color plus clear" systems for automotive refinishing. Coating compositions of the present invention essentially solve this problem while still providing excellent curing properties, as well as durability and appearance properties for cured films prepared from the compositions.

A coating composition of the invention can be cured by heating or without heating, typically at ambient temperature in the presence of a catalytic agent such as those described above. Once the hydroxyl component (a) and the anhydride component (b) are brought in contact with each other, usually in the presence of a catalytic agent, the components will begin to react. Accordingly, it is desirable in some instances to prepare the compositions of this invention in the form of a two package system, i.e., one package containing the hydroxyl component, often along with the aforesaid catalytic agent, and a second package containing the anhydride component. Although, it should be understood that with the appropriate choice of catalyst, one package compositions can be prepared.

A coating composition of the invention can be pigmented or unpigmented. Suitable pigments include a wide variety of pigments such as opaque, transparent and translucent pigments generally known for use in coating compositions. Metallic flake pigments and various uncolored, white, and colored pigments may be utilized as well as dyes. The particular advantage of coating compositions of the invention being non-yellowing as discussed above is especially advantageous when the compositions are utilized in white, light colored, and clear forms, especially in coating applications where color matching is important. The compositions are particularly suited for use as crosslinking, clear topcoating compositions which cure to transparent, crosslinked films in "color plus clear" systems for automotive finishing applications, especially automotive refinishing applications. It should be noted that a preferred embodiment of the "color plus clear" method of the present invention is that in which the basecoating composition and the topcoating (or clearcoating) composition are allowed to dry or cure together.

Accordingly, the present invention is also for a method of coating comprising the steps of: (I) coating a substrate with one or more applications of a pigmented basecoating composition to form a basecoat, and (II) coating the basecoat with one or more applications of a transparent topcoating composition to form a transparent topcoat, wherein the basecoating composition and/or the topcoating composition is a non-yellowing coating composition of the invention. It is preferred that the transparent topcoating composition comprise a composition of the invention. Additionally, when only one of the basecoating and topcoating composition is based on a coating composition of the invention, the other contains a film-forming system based on a thermoplastic and/or thermosetting film-forming resin typically selected from the generally known cellulosics, acrylics, aminoplasts, urethanes, polyesters, epoxies or mixtures thereof. These film-forming resins can be employed optionally in combination with various ingredients generally known for use in coating compositions containing film-forming resins of these general classes. Examples of these various ingredients include: fillers; plasticizers; antioxidants; mildewcides and fungicides; surfactants; various flow control agents including, for example, thixotropes and also additives described previously for sag resistance and/or pigment orientation based on polymer microparticles. It should be understood that the term "thermosetting" is being used in a broad sense to include any suitable crosslinking resin, even if crosslinking is effected without the application of heat.

The following examples are illustrative of the invention and are not intended to be limiting.

EXAMPLE 1

This example illustrates the preparation of a hydroxy alkyl sorbate ester.

A reaction vessel equipped with a stirrer, condenser, thermometer and nitrogen inlet was charged with 588.0 grams(g) (2.4 equivalents) of Cardura E (available from Shell Chemical Company), 224.0 g (2.0 equivalents) of sorbic acid (available from Aldrich Chemical Company), 1.62 g ethyl triphenylphosphonium iodide (available from Shell Chemical Company), 0.08 g 2,6-di-t-butyl-p-cresol (Ionol from Shell Chemical Company), 0.4 g triphenylphosphite and 346.0 g methyl propyl ketone and heated to 110° C. The contents of the reaction vessel were stirred until the acid value was less than 0.2. The resulting product had a total solids content measured at 110° C. for one hour of 63.7% by weight, a Gardner-Holdt viscosity of less than A, a Gardner color of 4 and an acid value of 0.

EXAMPLE 2

This example illustrates the preparation of a polyurethane polyene.

A reaction vessel equipped in the same manner as the above example was charged with 560.3 g (0.966 hydroxyl equivalents) of the ester of Example 1 and heated to 65° C. Then, a solution of polyisocyanate Desmodur N-3390 (208.7 g, 0.966 equivalents) (available from Mobay Chemical Corporation) and 0.9 dibutyltin dilaurate was added over 30 minutes. An additional 59.0 g methyl ketone were added and the resulting reaction mixture was heated to 80° C. and monitored regularly by infrared spectral analysis until no evidence of isocyanate was detected. The resulting product had a total solids content measured at 110° C. of 68.8% by weight, a Gardner-Holdt viscosity of N-O, and an acid value of 0.3.

EXAMPLE 3

This example illustrates the preparation of a polyurethane polyanhydride oligomer. The reaction product from the previous example (759.9 g, 0.886 sorbate equivalents) was heated to 65° C. in a reaction vessel and maleic anhydride (82.5 g, 0.841 equivalents) was added portion-wise to the vessel over 30 minutes followed by 35.3 g methyl propyl ketone. The reaction contents were stirred for one hour at this temperature. As this point, the reaction contents had a Gardner color of 2-3, a viscosity of N+ and a free maleic anhydride content of 2.4% by weight as determined by HPLC. Then, the reaction contents were heated to 90° C. and stirred at this temperature for 3 hours. The reaction product had a solids content of 69.3% by weight, an epoxy equivalent of 7881, an acid value of 51.5, a wet acid value of 97.5, a free maleic anhydride content of 0.7% by weight, a Gardner color of 13, and a Gardner-Holdt viscosity of U+.

EXAMPLE 4

This example illustrates the use of another epoxide to prepare a hydroxyalkyl sorbate ester and its subsequent reaction with a polyisocyanate and maleic anhydride.

A reaction vessel equipped with a stirrer, condenser, thermometer, and nitrogen inlet was charged with butyl glycidyl ether (107.2 g, 0.82 equivalents, from Shell Chemical Company), sorbic acid (84.0 g, 0.75 equivalents), Ionol (0.04 g) and ethyl triphenylphosphonium iodide (0.96 g) and heated to 110° C. The acid value of the reaction contents was monitored regularly until the value was less than 10 and then the reaction was cooled to less than 70° C. Dibutyltin dilaurate (0.5 g), polyisocyanate IPDI T-1890L (232.3 g, 0.678 equivalents, available from Huls America) and xylene (75.9 g) were added to the reaction vessel, contents were heated to 80° C. and stirred for 3 hours. After this time, isocyanate was still present by infrared spectral analysis and, therefore, the reaction solution was heated to 95° C. and stirred until no evidence of isocyanate was present.

The following day, maleic anhydride (63.1 g, 0.644 equivalents) was added to the reaction vessel, the contents heated to 90° C. and stirred for 2 hours. Butyl acetate (259.2 g) was added to afford a product with a solids content of 50.5% by weight, a viscosity of J, an acid value of 51.1, a weight average molecular weight of 4351 and a number average molecular weight of 1599.

EXAMPLE 5

The example illustrates the preparation of an acrylic polyisocyanate.

The following monomers were used to make the acrylic polyisocyanate.

| | % By Weight |
|---|---|
| m-Isopropenyl-alpha,alpha-dimethylbenzyl isocyanate (m-TMI) | 35.0 |
| Methyl Methacrylate | 25.0 |
| Butyl Acrylate | 25.0 |
| Styrene | 15.0 |

A reaction vessel equipped with stirrer, thermometer, condenser, addition funnels, and nitrogen inlet was charged with 400.0 g of xylene and heated to reflux, about 138° C. Two feeds, identified herein as A and B, were gradually and simultaneously added to the vessel over a period of 3 hours while the contents of the vessel were maintained at reflux conditions. Feed A consisted of 350.0 g m-TMI, 250.0 g methyl methacrylate, 250.0 g butyl acrylate and 150.0 g styrene. Feed B consisted of 50.0 g 2,2'-azobis(2-methylbutanenitrile) (VAZO 67 available from DuPont Company) and 150.0 g xylene. After the addition of the two feeds A and B was complete, the contents of the vessel were allowed to reflux for 1 hour after which a mixture of 10.0 g VAZO 67 and 56.6 g xylene were added to the vessel over a period of 45 minutes followed by reflux for an additional two hours.

The resultant product had a total solids content measured for 1 hour at 110° C. of 60.9% by weight; had residual content of methyl methacrylate and m-TMI, respectively, of 0.61% and 1.5% by weight; had a peak molecular weight of 8455, a weight average molecular weight of 7917 and a number average molecular weight of 2964 determined by gel permeation chromatography using a polystyrene standard.

EXAMPLE 6

This example illustrates the preparation of a polyurethane polyanhydride using an acrylic polyisocyanate as one of the starting materials. A reaction vessel equipped with stirrer, thermometer and nitrogen inlet was charged with 705.6 g (0.736 isocyanate equivalents) of Example 5, 125.4 g (0.737 equivalents) hydroxypropyl sorbate (available from Chisso Corporation), 0.6 g dibutyltin dilaurate and 0.35 g Ionol and the vessel contents heated to 85° C. The reaction contents were stirred at this temperature until no evidence of isocyanate was observed by infrared spectral analysis. Then, 69.9 g (0.713 equivalents) maleic anhydride was added in portions followed by 223.1 g n-butyl acetate. The reaction contents were stirred for 9 hours to afford a product with solids content measured at 110° C. for 1 hour of 58.3% by weight, an acid value of 35.7, a wet acid value of 70.9, a peak molecular weight of 10,626, a weight average molecular weight of 11.442 and a number average molecular weight of 5225.

EXAMPLE 7

This example illustrates the preparation of an acrylic polyol for utilization in a composition of the invention.

A reaction vessel equipped with stirrer, thermometer, condenser and addition funnels was charged with 1448.8 g xylene and 348.8 g isostearic acid (available as PRISORINE 3505 from Unichema Chemicals, Inc.) and heated to reflux (about 136° C.). Two feeds, identified herein as Feed A and Feed B, were gradually and simultaneously added to the vessel over a period of two hours while the contents of the vessel were maintained at reflux conditions. Feed A consisted of a mixture of 648.0 g styrene, 233.6 g hydroxypropyl acrylate, 259.2 g 4-hydroxybutyl acrylate (available from BASF Corporation), 337.2 g methyl methacrylate and 173.6 g glycidyl methacrylate. Feed B consisted of a mixture of 100.0 g VAZO 67 and 484.8 g xylene. After the addition of the two feeds A and B was complete, the contents of the vessel were allowed to reflux and the acid value was monitored until it reached less than 4.0 (after about 6 hours). The resulting product was allowed to cool and was thinned with 133.2 g xylene.

The resultant product had a total solids content of 49.8% measured for 1 hour at 110° C.; had residual contents of methyl methacrylate, styrene and glycidyl methacrylate of 0.20%, 0.11% and 0.04%, respectively; had a Gardner-Holdt bubble tube viscosity of F-G; had a hydroxyl value of 63.6 Mg KOH/g; had an acid value of 3.1 mg KOH/g; had an epoxy equivalent weight of 18,468; had an APHA color of 20–30; had a peak molecular weight of 7875, a weight average molecular weight of 2496 as determined by gel permeation chromatography utilizing a polystyrene standard.

EXAMPLE 8

A reaction vessel equipped with a stirrer, condenser, addition funnels, thermometer and nitrogen inlet was charged with 370.7 g Dowanol PM acetate, 761.5 g xylene and 356.0 g Cardura E and heated to reflux. Two feeds, identified herein as Feed A and Feed B, were gradually and simultaneously added to the vessel over a period of two hours while the contents of the vessel were maintained at reflux conditions. Feed A consisted of 583.8 g styrene, 421.4 g hydroxyethyl methacrylate, 278.6 g methyl methacrylate, 116.2 g acrylic acid and 49.0 g t-dodecyl mercaptan. Feed B consisted of 125.0 g xylene and 56.0 g di-t-butyl peroxide. After the addition of the two feeds A and B was completed, the contents of the vessel were allowed to reflux for 4 hours. The resulting product was allowed to cool and was thinned with 116.4 g Solvesso-100 and 63.2 g n-butyl acetate.

The resultant product had a total solids content of 56.4% measured at 110° C. for 1 hour; had a viscosity of 19.8 stokes; had a Gardner color of 1, had an acid value of 7.0 mg KOH/g; had a hydroxyl value of 86.2 mg KOH/g; had a peak molecular weight of 9261 as determined by gel permeation chromatography utilizing a polystyrene standard.

EXAMPLE 9

This example illustrates the preparation of a polyurethane polyanhydride.

A reaction vessel equipped with a stirrer, condenser, thermometer, nitrogen inlet and an addition funnel was charges with 1735.5 grams of polyisocyanate IPDI-T 1890L (5.06 equivalents), 0.48 grams of Ionol and 2.25 grams of dibutyltin dilaurate and heated to 70° C. A solution of 574.5 grams of hydroxypropyl sorbate (3.38 equivalents) and 574.5 grams of n-butyl acetate was added to the reaction vessel over a period of 45 minutes while maintaining the reaction temperature at less than 80° C. After the addition was complete, the reaction temperature was increased to 80° C. and the vessel contents stirred for one hour. Then, 100.0 grams of 1,6-hexanediol (1.69 equivalents) were added over a 10 minute period followed by 588.3 grams of n-butyl acetate. The reaction was stirred at 80° C. until infrared spectral analysis showed no evidence of isocyanate. Maleic anhydride (318.0 grams, 3.24 equivalents) and 149.9 grams of n-butyl acetate were introduced to the reaction and the resulting reaction mixture heated to 85° C. After reaching 85° C., the reaction was monitored regularly by infrared spectral analysis, Gardner-Holdt viscosity and APHA color for 8.5 hours. The resulting product had a total solids content measured at 110° C. for one hour of 60.6% by weight, a viscosity of Z4-, a color of 150–200, an acid value of 44.8 and free maleic anhydride of 0.1% by weight.

EXAMPLE 10

This example was similar to Example 9, above, but used a different diol.

A reaction vessel equipped with a stirrer, condenser, thermometer, addition funnel and nitrogen inlet was charged with 1388.3 g IPDI T-1890L polyisocyanate (4.05 equivalents), 0.43 g Ionol and 2.16 g dibutyltin dilaurate and the contents heated to 70° C. A solution of hydroxypropyl sorbate (459.5 g, 2.70 equivalents) and 459.5 g n-butyl acetate was added over a period of 45 minutes while maintaining the temperature at less than 80° C. After the addition was completed, the reaction temperature was increased to 80° C. and the vessel contents stirred at this temperature for 1 hour. Then, 574.0 g DURACARB® 120 diol (1.35 equivalents, polycarbonate diol available from PPG Industries, Inc.) were added over a 10 minute period followed by 864.0 g n-butyl acetate. The reaction contents were stirred at 80° C. until infrared spectral analysis exhibited no evidence of isocyanate. Maleic anhydride (254.3 g, 2.59 equivalents) and 106.4 g n-butyl acetate were added to the reaction flask and the resulting mixture heated to 85° C. The reaction contents were then stirred for 6 hours to afford a product which had a solids content of 55.3% by weight (measured after 1 hour at 110° C.); had an APHA color of 150; had a Gardner-Holdt viscosity of Y-; had an acid value of 36.8 mg KOH/g; had a wet acid value of 69.9; had a free maleic anhydride content of 0.7% by weight; had a weight average molecular weight of 11,076 and a number average molecular weight of 3286 as determined by gel permeation chromatography.

EXAMPLE 11

Non-Isocyanate Downdraft Clearcoat

Part (A) of this example illustrates the preparation of a two-package clear topcoating composition of the invention. Part (B) of this example illustrates the application, curing, and resultant properties of the topcoating composition of Part (A).

(A) The components as set forth in the following Table 1 and 2 were mixed together.

TABLE 1

| Acrylic Polyol Package | Amount (grams) |
| --- | --- |
| Acrylic polyol of Ex. 7, above | 107.4 |
| Polysiloxane solution[1] | 1.0 |
| UV Absorber[2] | 2.1 |
| UV Absorber[3] | 2.0 |
| Dimethyl Cocoamine[4] | 3.0 |
| Toluene | 8.4 |
| Butyl Acetate | 12.6 |
| Ethyl-3-ethoxy Propionate[5] | 1.5 |

[1]Available as DC 200 from DOW Corning Corporation
[2]Available as UVINOL from BASF Corporation
[3]Available as TINUVIN 328 from Ciba-Geigy Corporation
[4]Armeen DM12D from ARMAK Chemical Division, Arizona Inc.
[5]Ektapro EEP from Eastman Chemical Products

TABLE 2

| Polyurethane Polyanhydride Package | Amount (grams) |
| --- | --- |
| Dowanol PM Acetate | 21.0 |
| Butyl Cellosolve Acetate | 21.0 |
| Butyl Acetate | 26.4 |
| Polyurethane polyanhydride of Ex. 9 | 72.9 |

(B) The clearcoating composition of Part (A) was spray applied to a pigmented basecoating composition to form a resultant composite coating which was allowed to dry for 20 minutes and then heated at 140° F. for 40 minutes. The composite coating was allowed to recover for at least one hour before initial testing was begun.

The pigmented basecoating composition consisted of DBU-3661 (a silver metallic pigmented composition available from PPG Industries, Inc., PPG Finishes). The basecoating composition was reduced 200% by volume with a reactive reducer available as DRR-1170 from PPG Industries, Inc., PPG Finishes. The basecoating composition was spray applied to 24 gauge cold rolled steel panels (treated with Bonderite 40, primed with a two-package, acrylic urethane primer surfacer available as K-200/K-201 from PPG Industries, Inc., PPG Finishes, and sanded with No. 400 grit paper, and sealed with DP-40/401, a two-component epoxy primer from PPG Industries, Inc., PPG Finishes reduced 50% by volume with DTE-101, a thinner from PPG Industries, Inc., PPG Finishes) to form a basecoat. The basecoat was allowed to flash for 30 minutes before clearcoating.

The resultant properties for the cured composite films were as set forth in the following Table 3. The following terms and abbreviations in Table 3 have the meanings set forth below.

"BC" means basecoat and "CC" means clearcoat.

"DFT" means dry film thickness in mills.

"20° Gloss" means "20 degree gloss" as conventionally measured 24 hours and 7 days, respectively, after application of the topcoating composition to the panel.

"DOI" means "distinctness of image" as conventionally measured 24 hours and 7 days, respectively, after application of the topcoating composition to the panel.

"Sward" refers to Sward Hardness as conventionally measured 24 hours and 7 days, respectively, after application of the topcoating composition to the panel.

"Pencil" refers to Pencil Hardness as conventionally measured 24 hours and 7 days, respectively, after application of the topcoating composition to the panel.

"Gasoline soak" means resistance to deterioration by the composite film to soaking for 3 minutes in gasoline, allowing to dry for 90 seconds and rubbing with a piece of cheese cloth. For gasoline soak a rating of 5 means excellent; a rating of 4 means good; a rating of 3 means fair; a rating of 2 means poor; and a rating of 1 means very poor. A rating of "A" means no gloss loss.

"Adhesion" refers to cross-hatch adhesion of the composite film to the substrate 24 hours and 7 days, respectively, after application determined according to ASTM test method D3359. The values for this test range from 0 to 5. A value of 5 for this test means that there was no adhesion failure (or no "pickoff") of the composite coating in any manner.

"Humidity" refers to humidity resistance determine utilizing a humidity chamber operating at 100 percent relative humidity at 37.8 degrees Celsius. The values in the table are 20 degree gloss readings for the composite coatings before placing them in the humidity chamber (i.e., 0 hours) and after 96 hours in the humidity chamber.

"Adhesion-H" refers to cross-hatch adhesion of the composite film to the substrate before and after 96 hours, in the humidity chamber described above, and is determined according to ASTM test method D3359.

"Toluene" refers to the solvent resistance of the coating when 2 drops of toluene are applied to the coating and allowed to evaporate. A rating of 5 means that there was no visible effect (deterioration) on the coating in this test; a rating of 3 means the toluene slightly softened and etched the coating; a rating of 2 means substantial softening of the coating accompanied by slight to moderate wrinkling.

curing and resultant properties of the topcoating composition of Part (A).

(A) The components as set forth in the following Tables 4, 5 and 6 are mixed together.

TABLE 4

| Acrylic Polyol Package | Amount (grams) |
|---|---|
| Color Package[1] | 73.8 |
| Acrylic polyol of Ex. 8, above | 74.1 |
| Polysiloxane Solution[2] | 1.0 |
| Flow Control Agent[3] | 0.5 |
| Butyl Acetate | 30.3 |
| Xylene | 6.6 |
| Butyl Cellosolve Acetate | 4.4 |

[1]The color package consists of 42.9 pbw titanium dioxide, 26.5 pbw of the product of Example 8 and 4.4 pbw butyl acetate.
[2]Available as DC-200 from DOW Corning Corporation
[3]Available as BYK 300 from BYK Mallinckrodt Chem. Produkte GmbH

TABLE 5

| Polyurethane Polyanhydride Package | Amount (grams) |
|---|---|
| Polyurethane polyanhydride of Ex. 9 | 59.7 |
| Butyl Acetate | 18.5 |
| Dowanol PM Acetate | 16.2 |
| Butyl Cellosolve Acetate | 21.6 |
| Ektapro EEP | 18.4 |

TABLE 6

| Additive/Catalyst Package | Amount (grams) |
|---|---|
| Tinuvin 328 | 3.0 |
| Uvinol 400 | 2.0 |
| Armeen DM12D | 2.5 |
| Toluene | 21.9 |
| Dowanol PM Acetate | 34.0 |
| Butyl Cellosolve Acetate | 6.0 |

(B) The color coating composition of Part (A) was spray applied at ambient atmospheric conditions to 24 guage cold rolled steel panels, which had been treated, primed, sanded and sealed (as described in the above example), in two double coats with a 15 minute flash at ambient conditions between coats.

The resultant composite films from the colorcoating composition of Part (A) were cured and resultant prop-

TABLE 3

| Composite Film | DFT BC/CC | 20° Gloss 24 Hr./168 Hr. | DOI 24 Hr./168 Hr. | Sward 1 Hr./24 Hr./168 Hr. | Pencil 1 Hr./24 Hr./168 Hr. |
|---|---|---|---|---|---|
| Part (A) | 0.5/4.6 | 94/93 | 75/75 | 4/10/14 | <6B/<6B/4B |

| Composite Film | Toluene 1 Hr./24 Hr./168 Hr. | Gasoline Soak 24 Hr./168 Hr. | Adhesion 24 Hr./168 Hr. | Humidity 0 Hr./96 Hr. | Adhesion - H 0 Hr./96 Hr. |
|---|---|---|---|---|---|
| Part (A) | 2/2/3 | 5A/5A | 5/5 | 93/86 | 5/4 |

EXAMPLE 12

Non-Isocyanate Colorcoat

Part (A) of this example illustrates the preparation of a three-package color coating composition of the invention. Part (B) of this example illustrates the application, erties were determined, the results being as set forth in the following Table 7. The following terms and abbreviations in Table 7 have the same meaning as set forth in the above coating composition example.

TABLE 7

| Composite Film | DFT | 20° Gloss 24 Hr./168 Hr. | DOI 24 Hr./168 Hr. | Sward 24 Hr./168 Hr. | Pencil 24 Hr./168 Hr. | Toluene 24 Hr./168 Hr. |
|---|---|---|---|---|---|---|
| Part (A) | 3.0 | 89/87 | 60/60 | 6/16 | 4B/F | 2/2 |

| | Composite Film | Gasoline Soak 24 Hr./168 Hr. | Adhesion 24 Hr./168 Hr. | Humidity 0 Hr./96 Hr. | Adhesion - H 0 Hr./96 Hr. |
|---|---|---|---|---|---|
| | Part (A) | 4A/5A | 5/5 | 85/69 | 5/5 |

What is claimed is:
1. A curable composition comprising
(a) a hydroxyl functional material, and

(b) a polyurethane polyanhydride oligomer characterized in that it comprises at least one moiety represented by the following structure

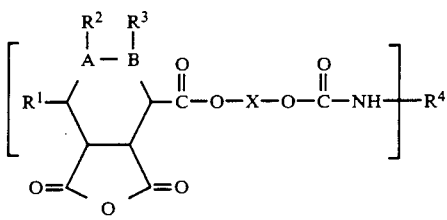

wherein:
X is:

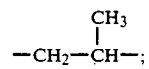

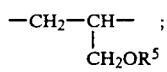

$-CH_2-CH-O-$;
     $|$
     $CH_2$
     $|$
     $O$

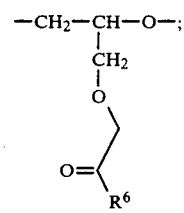

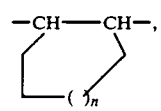

wherein n is 0, 1, 2, 3 a fused ring system;
$R^1$ is hydrogen or an aliphatic radical;
A and B are both CH— in which case $R_2$ and $R_3$ are independently hydrogen or an aliphatic radical; or A and B are connected to form $-C\!=\!C$;
$R^4$ is the residue of a mono or polyisocyanate;
$R^5$ is an aliphatic group, aromatic group, alicyclic group or

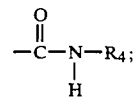

$R^6$ is an aliphatic, aromatic or alicyclic group.

2. The curable composition of claim 1 wherein the composition is a coating composition.

3. The coating composition of claim 2 wherein the hydroxyl containing material is an acrylic polyol.

4. The coating composition of claim 3 wherein in the oligomer structure:
X is

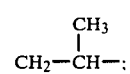

A and B are both $-C\!=\!$
$R^1$ is $CH_3$
$R^2$ is Hydrogen
$R^3$ is Hydrogen.

5. The coating composition of claim 2 wherein the anhydride equivalent weight of the oligomer does not exceed 1000.

6. The coating composition of claim 5 wherein the anhydride equivalent weight of the oligomer does not exceed 700.

7. The coating composition of claim 2 wherein the oligomer has a number average molecular weight ranging from about 670 to about 7000.

8. The coating composition of claim 2 wherein the amounts of hydroxyl material (a) and anhydride component (b) are selected to provide a ratio of equivalents of hydroxyl groups to equivalents of anhydride groups in the range of from about 3:1 to about 1:2.

9. The coating composition of claim 8 wherein the ratio is in the range of from about 1:1 to about 1.6:1.

* * * * *